UNITED STATES PATENT OFFICE.

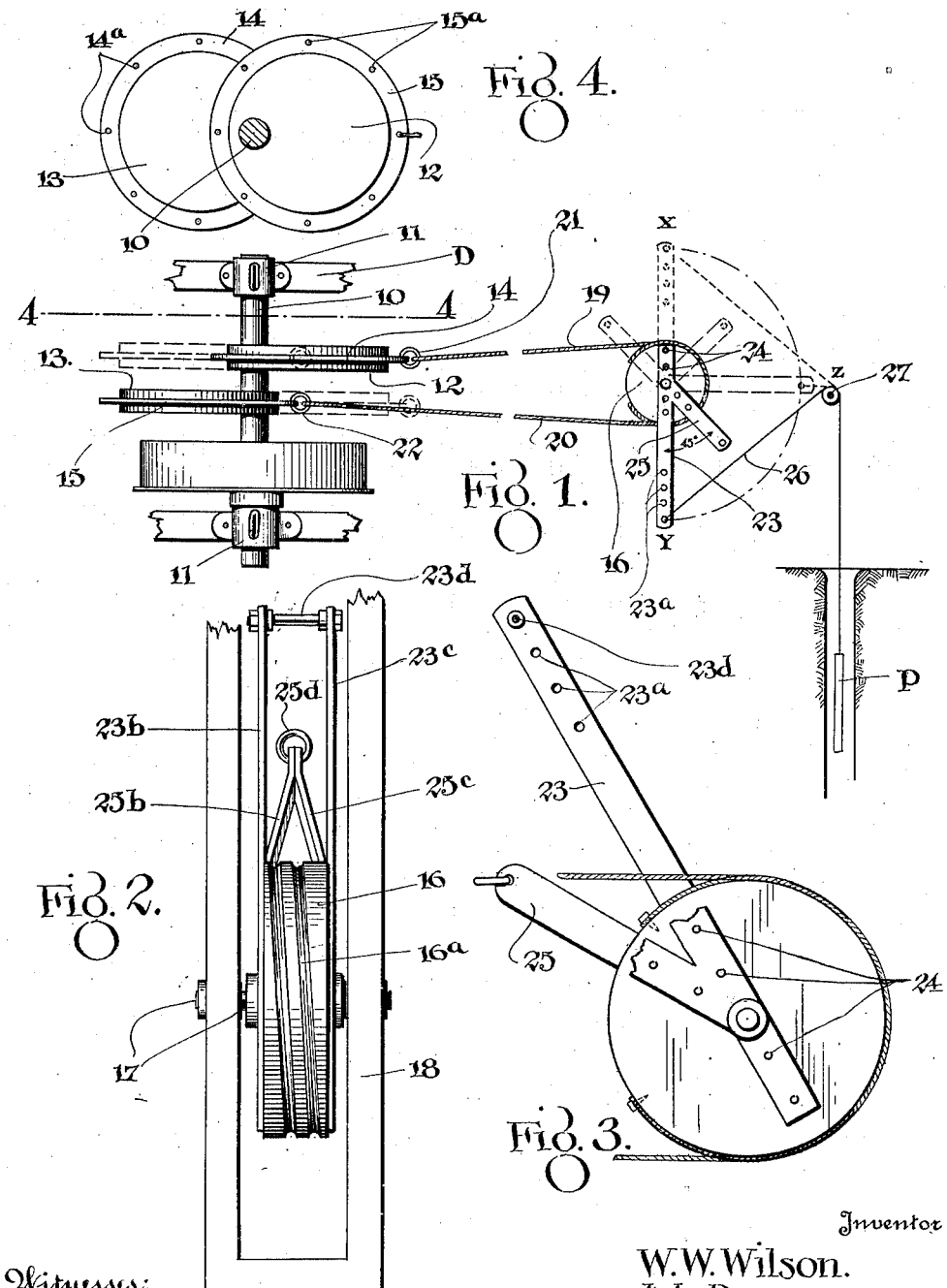

WILLIAM WILLIS WILSON AND JACKSON LEE PERRY, OF SAN LUIS OBISPO, CALIFORNIA.

CHANGE-SPEED GEARING.

1,372,384.    Specification of Letters Patent.    Patented Mar. 22, 1921.

Application filed December 3, 1920. Serial No. 428,033.

*To all whom it may concern:*

Be it known that we, WILLIAM WILLIS WILSON and JACKSON LEE PERRY, citizens of the United States, and residents of San Luis Obispo, in the county of San Luis Obispo and State of California, have invented certain new and useful Improvements in Change-Speed Gearing, of which the following is a specification.

The present invention relates in general to change speed gearing of the belt type, and more particularly to change speed gearing of the belt type especially adapted for use in connection with the drive mechanism of well pumps.

The object of the invention is to provide a change speed gearing of this character which is effective to double the frequency of the stroke or linear speed of the pump plunger over that normally imparted thereto whenever conditions make it desirable for a relatively high rate of plunger reciprocation; which is capable of being associated and organized with standard and conventional plunger drive mechanism; and which is of extremely simple and durable construction, reliable in operation, and easy and inexpensive to manufacture and maintain.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmentary view in side elevation showing the organized drive;

Fig. 2 is a plan view of the change speed gearing;

Fig. 3 is a side elevational view thereof; and

Fig. 4 is a detail view in side elevation of the power eccentrics.

Referring to the drawings, it will be seen that the invention contemplates a plunger pump such for instance as used in oil wells which is designated diagrammatically at P and drive mechanism therefor designated generally at D.

The drive mechanism includes a rotating power shaft 10 journaled in suitable bearings 11. The power shaft 10 receives its motion from any suitable power plant such as a motor or the like. Power eccentrics 12 and 13 of opposite throw are fixed to the power shaft 10 and rotate therewith. Loosely mounted on the eccentrics 12 and 13 are rings 14 and 15, respectively which are prevented from lateral displacement therefrom in any suitable manner while freely rotatable with respect thereto. The loose rings 14 and 15 are each provided with a circumferential series of openings designated at $14^a$ and $15^a$, respectively.

A rotatable pulley 16 has its axle 17 suitably journaled in a frame 18. The pulley 16 and its frame 18 are arranged in spaced relation with respect to the drive mechanism and preferably are intermediate or interposed between the drive mechanism and the plunger pump of the well. The face of the pulley 16 is provided with a spiral groove $16^a$ adapted to receive the runs of cables 19 and 20 which constitute motion transmission means for imparting the motion of the power eccentrics to the pulley 16. For this purpose one end of the cable 19 is secured as by a clevis 21 to the loose ring 14 of the power eccentric 12, the opposite end of the cable 19 being received in a portion of the groove $16^a$ and being secured at its extremity to the pulley 16. The cable 20 is connected at one end by a clevis 22 with the ring 15 of the power eccentric 13, the other end of the cable being received in another portion of the groove $16^a$ of the pulley 16 and the end of the cable is also secured to the pulley.

An arm 23 is fixed, as at 24, to the pulley 16 so that it is rotated when the pulley is rotated. As shown in Figs. 2 and 3, the arm 23 preferably consists of two members $23^b$ and $23^c$ arranged upon the opposite sides of the pulley and united at their outer ends by a cross bolt $23^d$. A second arm 25 is formed integral with the arm 23 and is thus also secured to the pulley to partake of motion therewith. The arm 25 also consists of two members, designated at $25^b$ and $25^c$ which are united at their outer end by means of the small ring $25^d$. The arm 23 is provided with a plurality of openings $23^a$ therein adapted for connection with the means for imparting reciprocatory motion to the plunger of the pump. This plunger reciprocating means is actuated by the drive mechanism D and serves to translate the motion of the drive mechanism into reciprocating motion of the plunger. This plunger reciprocating means may be of any conventional standard construction, such for instance the pump jack type but for the sake of illustration in the present invention it is shown simply as a cable 26 operating over a pulley 27 and connected at one end to the desired opening in the arm 23 or arm 25 as desired and at the other end to the plunger of the pump P.

In this embodiment of the invention the circumference of the pulley 16 is preferably equal to twice the stroke of the power eccentrics. Consequently when the power shaft makes one complete revolution the pulley 16 is rotated through 180° and the arm 23 is also rotated to this extent. The amplitude of the arm 23 is through 180° or from point $x$ to $y$. During its travel it passes through the point $z$, at which time it is in position to permit the plunger of the pump P to descend to the lower limit of its stroke. When the arm 23 is at either the points $x$ or $y$ the plunger of the pump P is raised to the upper limit of its stroke. It is obvious that the plunger of the pump P partakes of two strokes for each swing of the arm 23 from the point $x$ to the point $y$, hence it partakes of two strokes for each rotation of the shaft 10. The length of the stroke is determined by the radial extent of the arm 23 and consequently it may be varied by engaging the cable 26 with various openings of the series 23ª.

If it is desired to transmit the motion of the drive mechanism unchanged to the plunger of the pump, the cable 20 is disconnected so as to disconnect the power eccentric 13 from the pulley 26 and the cable 19 is also disconnected from the pulley 16 but its free end is connected to the arm 25. Thus the cable 19 is connected indirectly to the pulley 16. The arm 25 is preferably made of an extent equal to twice the radius of the pulley 16. With this arrangement when the power shaft 10 makes one revolution the pulley 16 is turned through 90° and the amplitude of the swing of the arm 23 is only from the points $x$ to $z$, consequently the plunger of the pump is reciprocated once for every complete rotation of the power shaft 10. This provides for the ready and easy doubling of the stroke that is for the increase of the stroke to twice the normal frequency. In the conventional and widely used plunger pumps and their drive mechanisms the plunger is normally reciprocated at approximately eleven strokes per minute. At times however it is desirable and often necessary to raise the stroke of the pump as for instance when water is present in the oil. On such occasions the stroke should be raised to approximately twenty-two strokes per minute. For this purpose it has been heretofore necessary to provide a separate motor from that which drives the power shaft 10.

With the present invention the stroke may be easily doubled by connecting the cable 19 and 20 as herein-above described while at the same time the normal drive of the plunger may be efficiently carried out at all times when this is desirable.

Having thus described our invention, we claim:

1. In a device of the character described for use with well pumps including a plunger, in combination with a power shaft, power eccentrics on said shaft, loose rings on said eccentrics, and means for imparting reciprocatory motion to the plunger of the pump, a rotatable pulley interposed between the power eccentrics and the plunger reciprocating means, a cable connecting the loose rings of one of said eccentrics with said pulley, a second cable connecting the other of said eccentrics to said pulley, an arm fixed to said pulley to rotate therewith and including spaced members embracing said pulley and a cross bolt connecting the outer ends of said members whereby the arm may be connected with the plunger reciprocating means.

2. In a device of the character described, for use with well pumps including a plunger, in combination with a power shaft, power eccentrics thereon, and means for imparting reciprocating movement to the plunger of the pump, a rotatable pulley interposed between the power eccentrics and the plunger reciprocating means, motion transmission means between the power eccentrics and said pulley, and an arm fixed to said pulley and connected with the plunger reciprocating means.

3. In a device of the character described, in combination with a power shaft, two power eccentrics thereon, a rotatable pulley, an arm fixed to said pulley, a second arm fixed to said pulley and angularly arranged with respect to said first arm and disposed relatively nearer said eccentrics, and means for transmitting in variable ratio the motion of said shaft to said pulley consisting of cables adapted to be connected to said eccentrics at one end and to said pulley at their opposite ends or to be connected to one of said eccentrics by said second arm, all as and for the purposes set forth.

4. In a device of the character described for use with well pumps including a plunger, in combination with a power shaft and means for imparting reciprocatory movement to the pump, a rotatable pulley interposed between the power shaft and the plunger reciprocating means and actuated from the power shaft, and an arm fixed to said pulley and connected with the plunger reciprocating means.

WILLIAM WILLIS WILSON.
JACKSON LEE PERRY.